(12) United States Patent
Sato

(10) Patent No.: US 9,963,000 B2
(45) Date of Patent: May 8, 2018

(54) PNEUMATIC TIRE

(71) Applicant: SUMITOMO RUBBER INDUSTRIES, LTD., Kobe-shi, Hyogo (JP)

(72) Inventor: Daisuke Sato, Kobe (JP)

(73) Assignee: SUMITOMO RUBBER INDUSTRIES, LTD., Kobe-Shi (JP)

(*) Notice: Subject to any disclaimer, the term of this patent is extended or adjusted under 35 U.S.C. 154(b) by 817 days.

(21) Appl. No.: 14/265,615

(22) Filed: Apr. 30, 2014

(65) Prior Publication Data
US 2014/0326386 A1 Nov. 6, 2014

(30) Foreign Application Priority Data

May 1, 2013 (JP) .................. 2013-096446

(51) Int. Cl.
B60C 13/04 (2006.01)
B60C 19/08 (2006.01)
(Continued)

(52) U.S. Cl.
CPC .......... *B60C 19/086* (2013.01); *B60C 1/0025* (2013.01); *B60C 1/0041* (2013.01);
(Continued)

(58) Field of Classification Search
CPC . B60C 2013/045; B60C 19/088; B60C 19/08; B60C 1/0025; B60C 19/082; B60C 19/084; B60C 19/086
(Continued)

(56) References Cited

U.S. PATENT DOCUMENTS 5,505,242 A * 4/1996 Narahara .................. B60C 3/04
152/454
5,872,171 A * 2/1999 Detrano ................ B60C 1/0016
524/492

(Continued)

FOREIGN PATENT DOCUMENTS

JP 2007-8269 A1 1/2007
JP 2010070642 A * 4/2010

OTHER PUBLICATIONS

Machine Translation: JP 2010070642 A; Fujikura, Keitaro; no date.*

*Primary Examiner* — Michael H. Wilson
*Assistant Examiner* — Kendra Ly
(74) *Attorney, Agent, or Firm* — Birch, Stewart, Kolasch & Birch, LLP

(57) ABSTRACT

Provided is a pneumatic tire ensuring conductivity while being reduced in weight, and having good fuel efficiency and handling stability. The tire includes a sidewall and a carcass, the sidewall including a laminate of two or more rubber layers including an inner sidewall layer (1) located closest to the carcass, and an outer sidewall layer (2) constituting an outer surface of the tire; the layer (1) including a rubber composition for (1); the layer (2) including a rubber composition for (2); the carcass including a carcass cord topped with a rubber composition for a carcass cord topping (3); the sidewall having a thickness of 3.0 mm or less; the layer (1) having a thickness of 0.2-1.0 mm; the composition for (1) having a volume resistivity of $5.0 \times 10^7$ Ω·cm or less; the compositions for (1) and for (2), and the compositions for (3) and for (1) satisfying specific relations.

6 Claims, 3 Drawing Sheets

(51) Int. Cl.
*B60C 1/00* (2006.01)
*B60C 9/02* (2006.01)
B60C 19/04 (2006.01)
B60C 13/00 (2006.01)

(52) U.S. Cl.
CPC .......... *B60C 9/0238* (2013.01); *B60C 19/082* (2013.01); *B60C 19/04* (2013.01); *B60C 2001/005* (2013.01); *B60C 2001/0066* (2013.01); *B60C 2009/0269* (2013.01); *B60C 2009/0276* (2013.01); *B60C 2009/0284* (2013.01); *B60C 2013/005* (2013.01); *B60C 2013/006* (2013.01); *B60C 2013/007* (2013.01); *B60C 2013/045* (2013.01)

(58) Field of Classification Search
USPC .................. 152/DIG. 2, 523–525, 152.1
See application file for complete search history.

(56) References Cited

U.S. PATENT DOCUMENTS

| | | | |
|---|---|---|---|
| 5,929,157 A * | 7/1999 | Matsuo | B60C 1/0025 524/492 |
| 2004/0173295 A1* | 9/2004 | Zanzig | B60C 1/00 152/209.5 |
| 2005/0103412 A1* | 5/2005 | Zanzig | B60C 15/06 152/152.1 |
| 2007/0000585 A1 | 1/2007 | Uchida et al. | |
| 2007/0131334 A1* | 6/2007 | Miyazaki | B60C 9/0042 152/556 |
| 2007/0135564 A1* | 6/2007 | Appel | B60C 1/0016 524/571 |
| 2007/0144658 A1* | 6/2007 | Miki | B29D 30/3028 156/130 |

* cited by examiner

PNEUMATIC TIRE

TECHNICAL FIELD

The present invention relates to a pneumatic tire.

BACKGROUND ART

Recent growing concerns about environmental issues have led to an increasingly strong demand for higher fuel efficiency of automobiles. Thus, highly fuel efficient rubber compositions for use in automobile tires are also required. In order to improve fuel efficiency; rubber compositions for automobile tires are designed using a technique of reducing the filling ratio of carbon black or a technique of incorporating a filler such as silica to reduce the energy loss; tires are designed using a a technique of reducing the weight of tires to reduce the energy loss. However, if the weight of a tire is reduced by reducing the amount of carbon black or by reducing the volume of a sidewall rubber (i.e. by reducing the thickness of a side-wall), then an increase in the electrical resistance of the tire may be caused, which may lead to radio noise or cause an electrical discharge daring fueling to ignite gasoline.

For example, Patent Literature 1 suggests a tire that is provided with a highly electrically conductive rubber layer to suppress an increase of the electrical resistance of a tire, and has achieved a reduction in weight. However, although this method ensures conductivity of the lightweight fire, the rubber stiffness of the side of the tire is reduced with a reduction in the volume of a sidewall rubber, to cause deterioration in handling stability. Therefore, there still remains room for improvement in achieving fuel efficiency and handling stability at the same time.

CITATION LIST

Patent Literature

Patent Literature 1: JP 2007-8269 A

SUMMARY OF INVENTION

Technical Problem

The present invention aims to provide a pneumatic tire capable of ensuring conductivity while being reduced in weight, and further having good fuel efficiency and handling stability, to solve the above problems.

Solution to Problem

The present invention relates to a pneumatic tire including a sidewall and a carcass, the sidewall including a laminate of two or more rubber layers including an inner sidewall layer (1), which is located closest to the carcass, and an outer sidewall layer (2), which constitutes an outer surface of the tire; the inner sidewall layer (1) including a rubber composition for an inner sidewall layer (1); the outer sidewall layer (2) including a rubber composition for an outer sidewall layer (2); the carcass including a carcass cord topped with a rubber composition for a carcass cord topping (3); the sidewall having a thickness of not more than 3.0 mm, the inner sidewall layer (1) having a thickness of 0.2 to 1.0 mm; the rubber composition for an inner sidewall layer (1) having a volume resistivity of not more than $5.0 \times 10^7$ Ω·cm; the rubber composition for an inner sidewall layer (1) and the rubber composition fox an outer sidewall layer (2) satisfying the following relation (1), the rubber composition for a carcass cord topping (3) and the rubber composition for an inner sidewall layer (1) satisfying the following relation (2):

$$1.15 \leq E^*(1)/E^*(2) \leq 3.00 \quad (1)$$

$$1.00 \leq E^*(1)/E^*(3) \leq 2.50 \quad (2)$$

wherein $E^*(1)$ is a complex elastic modulus of the rubber composition for an inner sidewall layer (1), $E^*(2)$ is a complex elastic modulus of the rubber composition for an outer sidewall layer (2), and $E^*(3)$ is a complex elastic modulus of the rubber composition for a carcass cord topping (3).

Preferably, the rubber composition for an inner sidewall layer (1) contains, per 100 parts by mass of a rubber component, 5 to 80 parts by mass of a carbon black (I) with a nitrogen adsorption specific surface area ($N_2SA$) of 20 to 100 $m^2/g$ and 2 to 15 parts by mass of a carbon black (II) with a nitrogen adsorption specific surface area ($N_2SA$) of 600 to 1500 $m^2/g$ and at least one of the rubber composition for an outer sidewall layer (2) and the rubber composition for a carcass cord topping (3) has a volume resistivity of not less than $1.0 \times 10^8$ Ω·cm.

The rubber composition for an inner sidewall layer (1) preferably contains; a styrene-butadiene rubber with a styrene content of 5 to 25% by mass and a vinyl content of 20 to 70% by mass in an amount of 5 to 35% by mass based on 100% by mass of a rubber component of the rubber composition; and a silica with a nitrogen adsorption specific surface area ($N_2SA$) of 50 to 200 $m^2/g$ in an amount of 5 to 35 parts by mass per 100 parts by mass of the rubber component.

The rubber composition for an outer sidewall layer (2) preferably contains, per 100 parts by mass of a rubber component, 2 to 35 parts by mass of a polybutadiene having a number average molecular weight (Mn) of 2000 to 15000 and a vinyl content of 0 to 50% by mass.

Advantageous Effects of Invention

The pneumatic tire of the present invention includes a carcass and a sidewall that includes a laminate of two or sore rubber layers including an inner sidewall layer (1), which is located closest ho the carcass, and en outer sidewall layer (2), which constitutes an outer surface of the tire; the sidewall has a thickness of not more than 3.0 mm and the inner sidewall layer (1) has a thickness of 0.2 to 1.0 mm; the inner sidewall layer (1) includes a rubber composition for an inner sidewall layer (1) and the outer sidewall layer (2) includes a rubber composition for an outer sidewall layer (2); the carcass includes a carcass cord topped with a rubber composition for a carcass cord topping (3); the rubber composition for an inner sidewall layer (1) has a volume resistivity or not more than a specific value; and specific relations are respectively made between the complex elastic modulus of the rubber composition for an inner sidewall layer (1) and the complex elastic modulus $E^*(2)$ of the rubber composition for an outer sidewall layer (2) and between the complex elastic modulus $E^*(3)$ of the rubber composition for a carcass cord topping (3) and the complex elastic modulus $E^*(1)$ of the rubber composition for an inner sidewall layer (1). Such a pneumatic tire is capable of ensuring conductivity (preventing accumulation of static electricity) while being reduced in weight, and further having good fuel efficiency and handling stability. Further, in the present invention, owing to the reduction of the weight of a tire, the amount of a rubber composition required for producing one tire can be reduced. Therefore, the amount of materials derived from oil resources can also be reduced.

DESCRIPTION OF EMBODIMENTS

Figure 1:
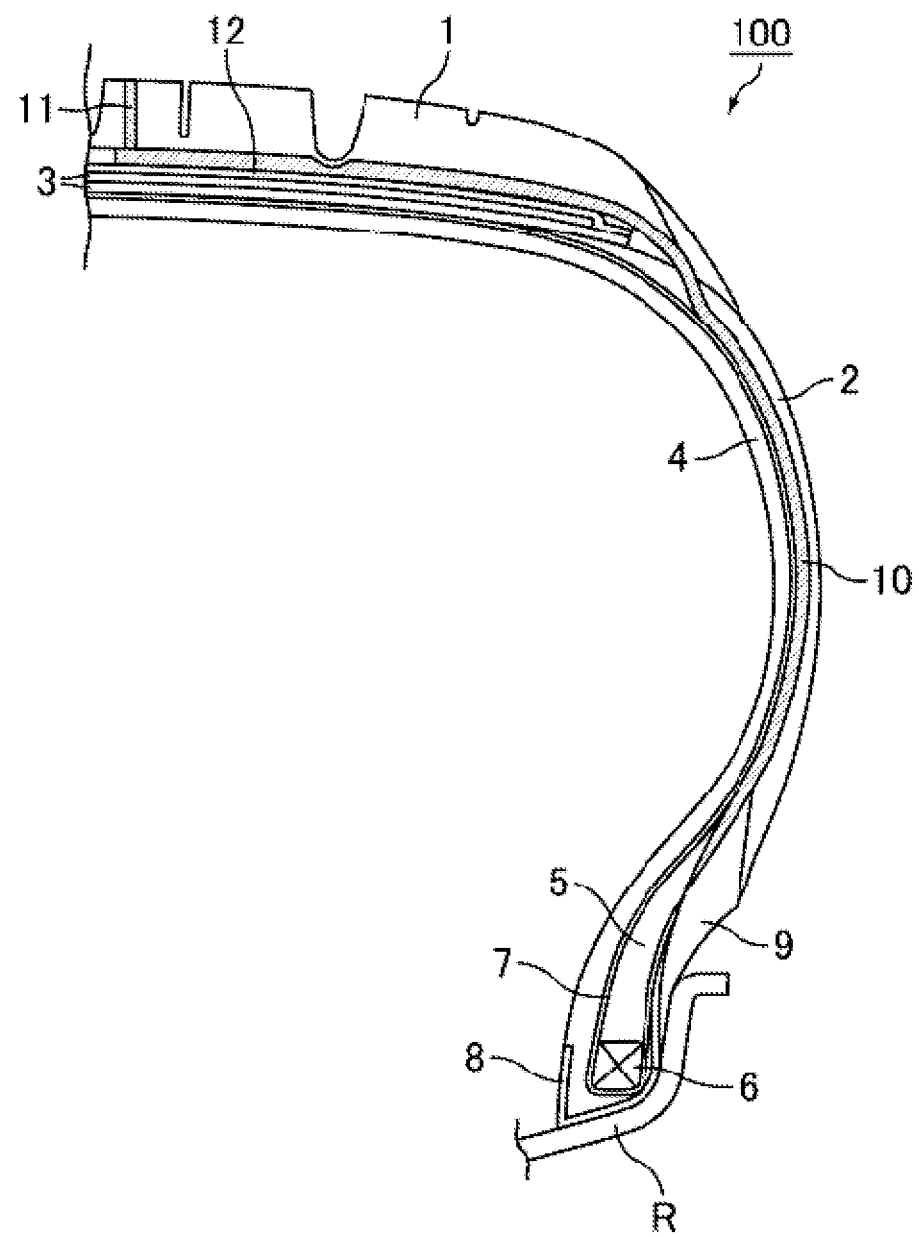
FIG. 1 shows an example of the upper right half of a cross-sectional view of the pneumatic tire of the present invention.

The pneumatic tire of the present invention includes a carcass and a sidewall that includes a laminate of two or more rubber layers including an inner sidewall layer (1), which is located closest to the carcass, and an outer sidewall layer (2), which constitutes an outer surface of the tire. The sidewall has a thickness of not more than 3.0 mm, and the inner sidewall layer (1) has a thickness of 0.2 to 1.0 mm. The inner sidewall layer (1) includes a rubber composition for an inner sidewall layer (1), and the outer sidewall layer (2) includes a rubber composition for an outer sidewall layer (2). The carcass includes a carcass cord topped with a rubber composition for a carcass cord topping (3). The rubber composition for an inner sidewall layer (1) has a volume resistivity of not more than a specific value. The complex elastic modulus E*(1) of the rubber composition for an inner sidewall layer (1) and the complex elastic modulus E*(2) of the rubber composition for an outer side/wall layer (2) satisfy the following relation (1), and the complex elastic modulus E*(3) of the rubber composition for a carcass cord topping (3) and the complex elastic modulus E*(1) of the rubber composition for an inner sidewall layer (1) satiety the following relation (2).

$$1.15 \leq E^*(1)/E^*(2) \leq 3.00 \quad (1)$$

$$1.00 \leq E^*(1)/E^*(3) \leq 2.50 \quad (2)$$

In the present invention, since the rubber composition for an inner sidewall layer (1) has a volume resistivity of not acre than a specific value and the inner sidewall layer (1) has a thickness within a specific range, good conductivity of the tire is ensured even though the tire is reduced in weight by reducing the thickness of the sidewall to a specific value or smaller. Further, since specific relations are made among the complex elastic modulus E*(2) of the rubber composition for an inner sidewall layer (1), the complex elastic modulus E*(2) of the rubber composition for an outer sidewall layer (2) f and the complex elastic modulus E*(3) of the rubber composition for a carcass cord topping (3), good fuel efficiency and handling stability are also provided. Therefore, a pneumatic tire can be provided which is capable of ensuring conductivity (preventing accumulation of static electricity) while being reduced in weight, and further having good feel efficiency and handling stability.

(Pneumatic Tire)

The structure of the pneumatic hire of the present invention is not particularly limited as long as the pneumatic tire includes a carcass and a sidewall that includes a laminate of two or more rubber layers including an inner sidewall layer (1), which is located, closest to the carcass, and an outer sidewall layer (2), which constitutes as outer surface of the tire, and the sidewall has a thickness of not sore than 3.0 mm and the inner sidewall layer (1) has a thickness of 0.2 to 1.0 mm. Such a structure allows to ensure conductivity (prevent accumulation of static electricity) while reducing the weight of a tire and further to provide good fuel efficiency and handling stability.

In the present invention, the thickness of the sidewall, the thickness of the inner sidewall layer (1), the thickness of the outer sidewall layer (2), and the thickness of the carcass refer to the thickness of each component, extending from the tire-axially outer side of the component in a direction normal to the side, as measured on a line drawn outwardly from the thinnest portion of the sidewall in the axial direction of the tire.

The conducting structure is not particularly limited as long as it forms a continuous conductive layer from a rim to a ground contact surface of a tread. In order to ensure good conductivity, for example, the inner sidewall layer (1) may directly form the continuous conductive layer, or in other words, the inner sidewall layer (1) may be formed continuously from a rim to a ground contact surface of a tread; or alternatively, the inner sidewall layer (1) may indirectly form the continuous conductive layer, or in other words, the inner sidewall layer (1) and other rubber(s) with good conductivity may be combined (electrically connected) to form a continuous conductive layer (a rubber layer with good conductivity) from a rim to a ground contact surface of a tread.

An example of the pneumatic tire of the present invention will be explained below, referring to figures.

<Basic Structure>

Figure 2:
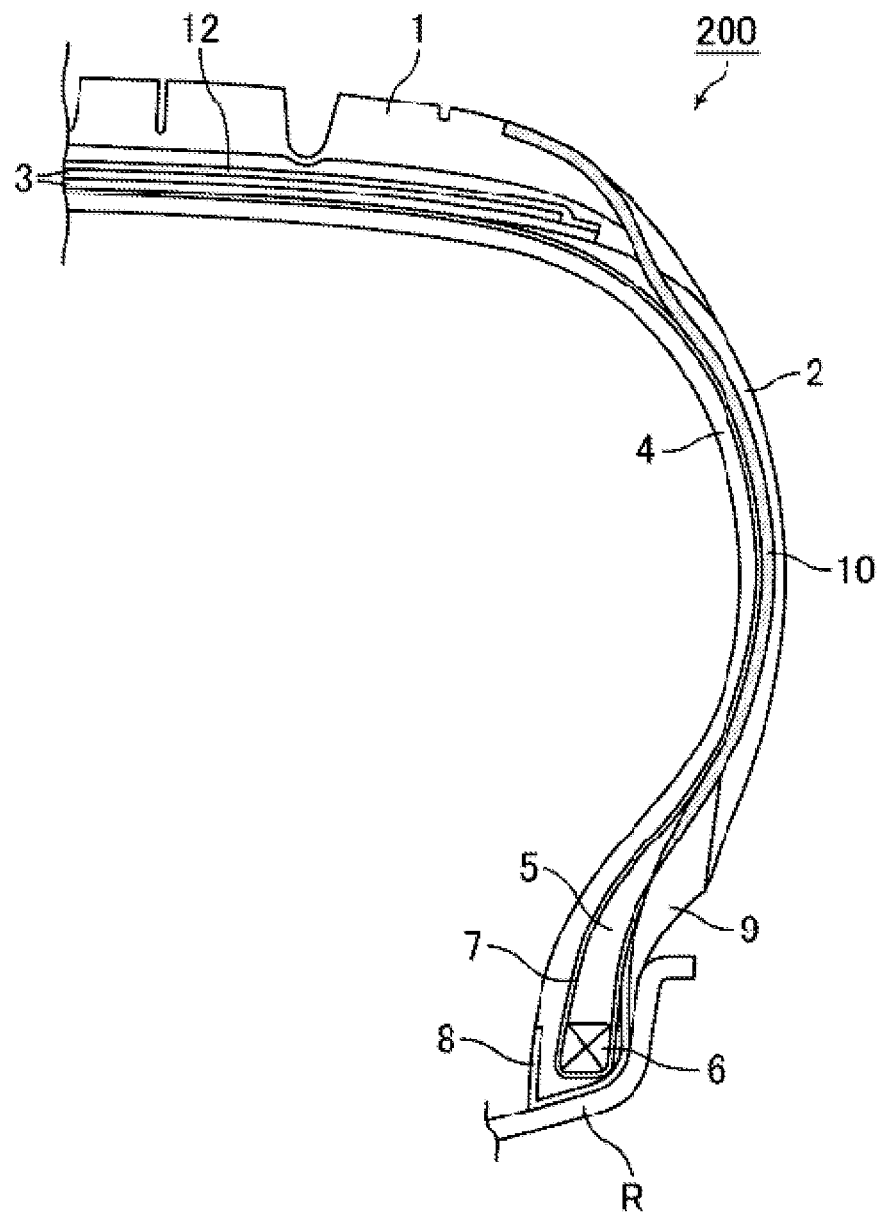
FIG. 2 shows an example of the upper right half of a cross-sectional view of the pneumatic tire of the present invention.
Figure 3:
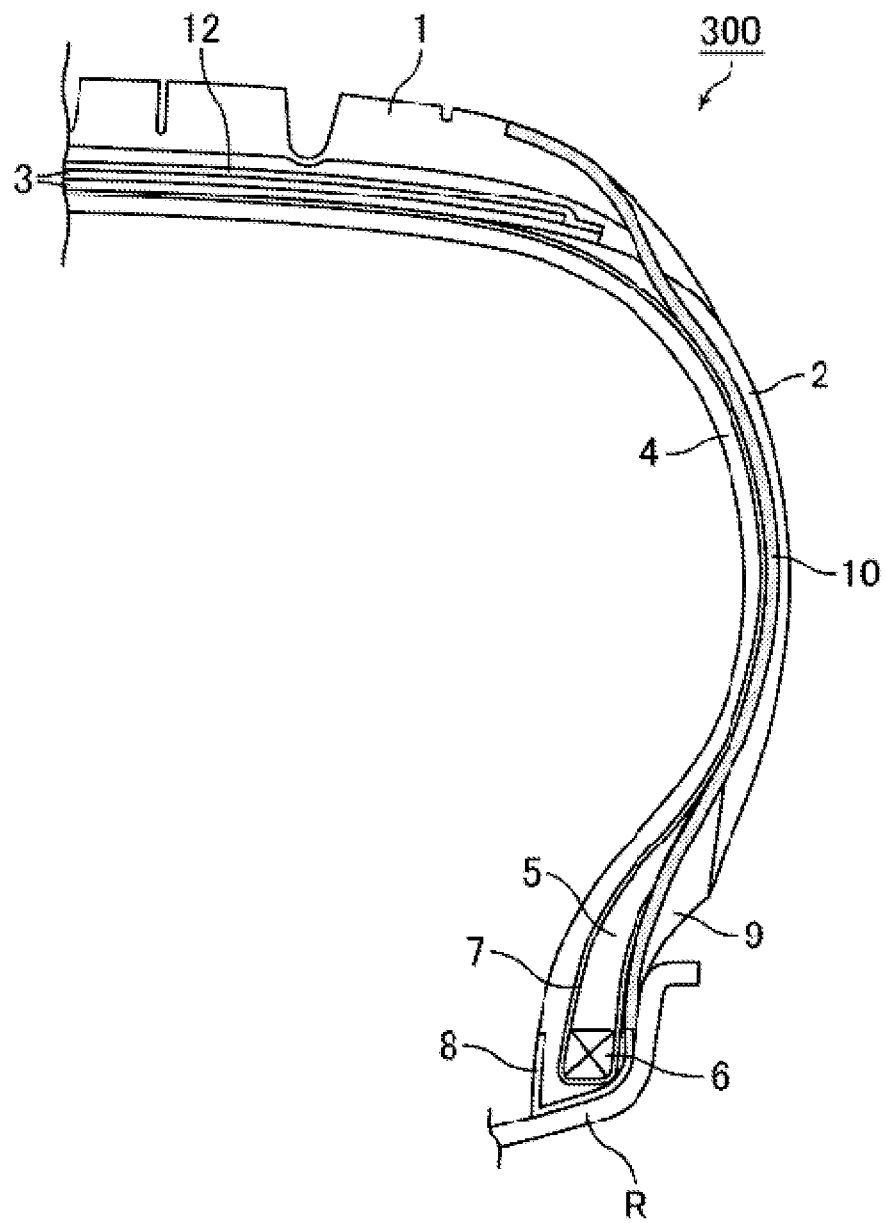
FIG. 3 shows an example of the upper right half of a cross-sectional view of the pneumatic tire of the present invention.

The structure of the pneumatic tire of the present invention is shown, for example, in FIGS. 1 to 3 illustrating the upper right half of a cross-sectional view of the tire. Pneumatic tires 100, 200 and 300 each include a tread rubber 1 forming a tread portion; outer sidewall layer (2) rubbers 2 forming a pair of sidewall portions, each of which extends inwardly in the tire radial direction from the either side of the tread rubber 1; clinch rubbers 9 forming clinch portions, each of which is located at an inner end of each sidewall portion; and chafer rubbers 8 forming chafer portions, each of which is located on top of a rim R. A carcass 7 is formed between the clinch portions or the chafer portions, and breaker rubbers 3 forming a breaker portion are disposed on the tire-radially outer side of the carcass 7. The carcass 7 is formed from at least one carcass ply in which carcass cords are arranged. The carcass ply extends from the tread portion along the sidewall portion, and is then folded around a bead core 6 and a bead apex 5 which extends from the upper end of the bead core 6 toward the sidewall, from tire-axially inside to outside, whereby it is fixed at the folded portion. The breaker portion includes two or more breaker plies in which breaker cords are arranged, and the breaker plies are stacked so that the breaker cords of one breaker ply and the breaker cords of another breaker ply cross each other.

A non-limiting embodiment of the pneumatic tire of the present invention has the following structure as shown in FIG. 1, for example. An inner sidewall layer (1) rubber 10 is formed continuously from a sidewall portion through a tread portion. In the sidewall portion, the rubber 10 is located between an outer sidewall layer (2) rubber 2 and a carcass 7, in contact with a clinch rubber 9. In the tread portion, the rubber 10 is disposed between the tread portion, and a breaker portion so as to cover the upper side of the breaker portion. A conducting rubber 11 is provided inside a tread rubber 1 so as to be in contact with the inner sidewall layer (1) rubber 10 and be partly exposed on a ground contact surface. Thus, a pneumatic tire 100 shown in FIG. 1 has a structure in which the conducting rubber 11, the inner sidewall layer (1) rubber 10, and the clinch rubber 3 are electrically connected to one another.

A further non-limiting embodiment of the pneumatic tire of the present invention has the following structure as shown in FIG. 2, for example. An inner sidewall layer (1) rubber 10 is formed continuously from a sidewall portion through a tread portion. In the sidewall portion, the rubber 10 is located between an outer sidewall layer (2) rubber 2 and a carcass 7, in contact with a clinch rubber 9. In the tread portion, the rubber 10 is located inside a tread rubber 1 so as to be partly exposed on a ground contact surface. Thus, a pneumatic tire 200 shown in FIG. 2 has a structure in which the inner sidewall layer (1) rubber 10 and the clinch rubber 9 are electrically connected to each other.

A further non-limiting embodiment of the pneumatic tire of the present invention has the following structure as shown in FIG. 3, for example. An inner sidewall layer (1) rubber 10 is formed continuously from a sidewall portion to a tread portion. In the sidewall portion, the rubber 10 is located between an outer sidewall layer (2) rubber 2 and a carcass 7, in contact with a rim R and a clinch rubber 9. In the tread portion, the rubber 10 is located inside a tread rubber 1 so as to be partly exposed on a ground contact surface. Thus, a pneumatic tire 300 shown, in FIG. 3 has a structure in which a conductive layer is formed from the inner sidewall layer (1) rubber 10 alone or a combination of the inner sidewall layer (1) rubber 10 and the clinch rubber 9, which are electrically connected to each other.

The use of the structure mentioned above makes it possible to prevent accumulation of static electricity because the static electricity generated in a bead portion rubber at a region which comes into contact with a rim or in a ground contact region during rolling of the tire is discharged outside the tire through the electrically connected conductive rubber components within the tire, as well as to reduce the weight and further provide good fuel efficiency and handling stability.

The FIGS. 1 to 3 illustrate that the sidewall portion is formed of a laminate of the inner sidewall layer (1) rubber 10, which is located closest to the carcass, and the outer sidewall layer (2) rubber 2, which constitutes an outer surface of the tire; however, one or two or sore other rubbers may be disposed between the inner sidewall layer (1) rubber and the outer sidewall layer (2) rubber.

The thickness of the sidewall (the sidewall portion) is not more than 3.0 mm, preferably not more than 2.8 mm, and more preferably not more than 2.6 mm. If the thickness is more than 3.0 mm, sufficient fuel efficiency cannot be provided, the thickness of the sidewall (the sidewall portion) is preferably not less than 1.3 mm, more preferably not less than 1.5 mm, still more preferably not less than 1.8 mm, and particularly preferably not less than 2.0 mm. If the thickness is less than 1.3 mm, sufficient conductivity and handling stability cannot be ensured. In addition, the carcass pattern may disadvantageously stand out to deteriorate the appearance.

The rubbers will be explained below.

<Inner Sidewall Layer (1) Rubber>

The volume resistivity of the inner sidewall layer (1) rubber is set to not more than $5.0 \times 10^7$ Ω·cm. If the volume resistivity is more than $5.0 \times 10^7$ Ω·cm, the electrical resistance ox the fixe increases enough to cause accumulation of static electricity in a vehicle, leading to various problems due to the phenomenon of discharge of static electricity. If the volume resistivity is not more than $5.0 \times 10^7$ Ω·cm, the effect of enhancing the tire conductivity is provided. The volume resistivity of the inner sidewall layer (1) rubber is preferably set to not more than $1 \times 10^7$ Ω·cm, more preferably not more than $1 \times 10^{6.5}$ Ω·cm, still more preferably not more than $1 \times 10^{5.5}$ Ω·cm, and particularly preferably not more than $1 \times 10^4$ Ω·cm. The lower limit of the volume resistivity of the inner sidewall layer (1) rubber is not particularly limited, and is preferably set to not less than $1 \times 10^3$ Ω·cm, and more preferably not less than $1 \times 10^4$ Ω·cm.

The "volume resistivity" herein refers to a volume resistance measured at an applied voltage of 1000 V under constant temperature and humidity conditions (temperature: 23° C., relative humidity: 55%) with other conditions as set forth, in JIS K 6271. Unless otherwise indicated, the term "volume resistivity" as employed herein alone refers to a volume resistivity measured by the above method.

When the inner sidewall layer (1) rubber has a thickness of not less than 0.2 mm, the effect of enhancing the tire conductivity can be achieved to a desired extent and, at the same time, good handling stability can be provided. The thickness is preferably not less than 0.3 mm. The use of the inner sidewall layer (1) rubber having a thickness of not more than 1.0 mm provides good fuel efficiency. The thickness is preferably not more than 0.5 mm.

Moreover, the portions in which the inner sidewall layer (1) rubber is in contact with the clinch rubber, the rim, or the conducting rubber each preferably form a strip with a width of not less than 5 mm in the circumferential direction of the tire. They are more preferably in contact with each other with a width of not less than 10 mm. The contact of the inner sidewall layer (1) rubber with the clinch rubber, the rim, or the conducting rubber under the conditions mentioned above sufficiently provides the tire conductivity effect.

The inner sidewall layer (1) rubber is prepared using a rubber composition for an inner sidewall layer (1).

(Rubber Composition for Inner Sidewall Layer (1))

Examples of rubber materials that can be used in the rubber component of the rubber composition for an inner sidewall layer (1) include, but are not limited to: diene rubbers such as natural rubber (NR), epoxidized natural rubber (ENR), and synthetic diene rubbers (e.g. isoprene rubber (IR), butadiene rubber (BR), styrene-butadiene rubber (SBR), styrene-isoprene-butadiene rubber (SIBR), chloroprene rubber (CR), acrylonitrile-butadiene rubber (NBR), ethylene-propylene-diene rubber (EPDM), butyl rubber (IIR), and halogenated butyl rubber (X-IIR)). In particular, NR, BR, and SBR are preferred in view of providing good fuel efficiency and handling stability. A combination of NR and BR is more preferred, and a combination of NR, BR, and SBR is still more preferred. The combined use of NR and BR can keep rolling resistance lower because of the characteristics of the rubber component, and further improve the dispersibility of carbon black, whereby fuel efficiency can be further improved.

Examples of NR include, but are not limited to, NRs commonly used in the tire industry, such as SIR20, RSS #3, and TSR20.

In the case of containing NR, the amount or NR based on 100% by mass of the rubber component is preferably not less than 30% by mass, and more preferably not less than 40% by mass. The amount of NR is preferably not more than 70% by mass, and more preferably not more than 60% by mass. When the amount of NR falls within the range mentioned above, the effects of the present invention can be more suitably achieved.

Examples of BR include, but are not limited to, BRs with a high cis content, such as BR1220 produced by Zeon Corporation and BR130B and BR150B produced by Ube Industries, Ltd.; and BRs containing syndiotactic polybutadiene crystals, such as VCR412 and VCR617 produced by Ube Industries, Ltd. in particular, BRs with a cis content of not less than 90% by mass are preferred because they provides good mechanical strength, handling stability, and fuel efficiency.

In the case of containing BR, the amount of BR based on 100% by mass of the rubber component is preferably not less than 30% by mass, and more preferably not less than 40% by mass, the amount of BR is preferably not more than 70% by mass, and more preferably not more than 60% by mass. When the amount of BR falls within the range mentioned above, the effects of the present invention can be more suitably achieved.

Examples of SBR include, but are not limited to, SBRs commonly used in the tire industry, such as emulsion-polymerized styrene-butadiene rubber (E-SBR) and solution-polymerized styrene-butadiene rubber (S-SBR). In particular, SBR having a styrene content of 5 to 25% by mass and a vinyl content of 20 to 70% by mass is preferred because then the effects (particularly, good fuel efficiency) of the present invention can be more suitably achieved. In regard to rubbers inside a tire, from which heat is less likely to be released, i.e., heat is easily stored, the use of a certain styrene-butadiene rubber enhances heat resistance of the polymer and improves the stiffness of the rubber particularly at high temperatures, whereby the handling stability during high speed driving can be increased. In the case of adding silica which contributes to improvement in fuel efficiency, but is inferior in reinforcing property to carbon black, as well as having the drawback that the reactivity of a silane coupling agent with natural rubber or polybutadiene rubber is poor, styrene-butadiene rubber can be used in combination with silica to provide the strength required of a sidewall rubber under high strain.

The lower limit of the styrene content is more preferably 10% by mass, and still more preferably 15% by mass. The lower limit of the vinyl content is more preferably 30% by mass, still more preferably 40% by mass, and particularly preferably 50% by mass.

In the present invention, the styrene content of SBR is determined by $^1$H-NMR measurement, and the vinyl content of SBR is determined by infrared absorption spectroscopy analysis.

In the case of containing SBR, the amount of SBR based on 100% by mass of the rubber component is preferably not less than 5% by mass, and more preferably not less than 10% by mass. The amount of SBR is preferably not more than 35% by mass, and more preferably not more than 30% by mass. When the amount of SBR falls within the range mentioned above, the effects of the present invention can be more suitably achieved.

The rubber composition for an inner sidewall layer (1) preferably contains carbon black. The carbon black is not particularly limited, and preferably includes a carbon black (II) having a nitrogen adsorption specific surface area ($N_2SA$) of 600 to 1500 $m^2/g$. The carbon black (II) is more preferably used in combination with a carbon black (I) having a nitrogen adsorption specific surface area ($N_2SA$) of 20 to 100 $m^2/g$.

The combined use of the carbon black (I) and the carbon black (II) provides better fuel efficiency. Moreover, the use of the carbon black (II) with a high $N_2SA$ enables to provide high conductivity to the inner sidewall layer (1) rubber. However, the use of such a high $N_2SA$ carbon black (II) results in the formation of localized domains with high rubber stiffness in the inner sidewall layer (1) rubber. Such localized portions with high stiffness in the inner sidewall layer (1) rubber may form crack initiation sites when stress is concentrated at the portions during the deformation of the sidewall. In the present invention, the complex elastic moduli of the outer sidewall layer (2) rubber and the carcass cord topping (3) rubber, which are adjacent to the inner sidewall layer (1) rubber, are controlled (so that the complex elastic moduli satisfy the aforementioned specific relations) to reduce the concentration of stress, thereby providing good durability. Further, the use of the carbon black (I) having a relatively large particle size together with the high $N_2SA$ carbon black (II) results in the formation of soft domains in the inner sidewall layer (1) rubber. Such domains serve as adhesive domains, thereby providing better durability.

The carbon black (I) has a nitrogen adsorption specific surface area ($N_2SA$) of not less than 20 $m^2/g$, preferably not less than 30 $m^2/g$. If the $N_2SA$ is less than 20 $m^2/g$, sufficient handling stability may not be obtained. The $N_2SA$ is not more than 100 $m^2/g$, preferably not more than 80 $m^2/g$, and more preferably not more than 60 $m^2/g$. If the $N_2SA$ is more than 100 $m^2/g$, the carbon black is less likely to disperse and thus the fuel efficiency and durability tend to be poor.

The $N_2SA$ of carbon black herein is determined according to JIS K 6217-2: 2001.

The carbon black (I) preferably has a dibutyl phthalate oil absorption (DBP) of not less than 50 ml/100 g. The DBP is more preferably not less than 80 ml/100 g, and still, more preferably not less than 100 ml/100 g. Also, the DBP of the carbon black (I) is preferably not more than 200 ml/100 g, and more preferably not more than 150 ml/100 g. Then good fuel efficiency and good handling stability can be achieved at the same time.

The DBF of carbon black herein is measured in accordance with JIS K6217-4: 2001.

In the case of containing the carbon black (I), the amount of the carbon black (I) per 100 parts by mass of the rubber component is preferably not less than 5 parts by mass, more preferably not less than 15 parts by mass, still more preferably not less than 30 parts by mass, particularly preferably not less than 40 parts by mass, and most preferably not less than 45 parts by mass. If the amount is less than 5 parts by mass, sufficient handling stability may not be obtained. The amount is preferably not more than 80 parts by mass, and more preferably not more than 65 parts by mass. If the amount is more than 80 parts by mass, the carbon black is less likely to disperse and thus the fuel efficiency and durability tend to be poor.

The carbon black (II) has a nitrogen adsorption specific surface area ($N_2SA$) of not less than 600 $m^2/g$, preferably not less than 700 $m^2/g$, more preferably not less than 800 $m^2/g$, further preferably not less than 900 $m^2/g$, and particularly preferably not less than 1100 $m^2/g$. If the $N_2SA$ is less than 600 $m^2/g$, sufficient conductivity (for preventing accumulation of static electricity) may not be obtained, and the rolling resistance properties may not be improved when the carbon black is added in an amount repaired for the same conductivity. The $N_2SA$ is not more than 1500 $m^2/g$, preferably not more than 1400 $m^2/g$, and more preferably not more than 1300 $m^2/g$. If the $N_2SA$ is more than 1500 $m^2/g$, the carbon black is less likely to disperse and thus the fuel efficiency and durability tend to be poor. Additionally, such a carbon black is difficult to prepare, which may unnecessarily increase the cost.

The carbon black (II) preferably has a dibutyl phthalate oil absorption (DBP) of not less than 180 ml/100 g, more preferably not less than 300 ml/100 g, still more preferably not less than 400 ml/100 g, and particularly preferably not less than 450 ml/100 g. Then good antistatic properties (prevention of accumulation of static electricity) and good rolling resistance properties can be achieved at the same time, and an increase in the viscosity of the rubber composition can be suppressed to maintain processability well. The DBP of the carbon black (II) is preferably not more than 1000 ml/100 g, and more preferably not more than 600 ml/100 g. A carbon black having a DBF of more than 1000 ml/100 g is difficult to prepare, which may increase the cost.

In the case of containing the carbon black (II), the amount of the carbon black (II) per 100 parts by mass of the rubber component is preferably not less than 2 parts by mass, and more preferably not less than 5 parts by mass. If the amount is less than 2 parts by mass, sufficient conductivity may not be obtained. The amount is preferably not more than 25 parts by mass, more preferably not more than 15 parts by mass, and still more preferably not more than 10 parts by mass. If the amount is more than 25 parts by mass, the carbon black is less likely to disperse and thus the fuel efficiency and durability tend to be poor.

The rubber composition for an inner sidewall layer (1) preferably further contains silica. The silica is not particularly limited, and may be silica prepared by a wet process or a dry process. The use of silica can keep rolling resistance lower while ensuring reinforcing property, and can also ensure the properties needed for an inner sidewall layer rubber, such as flex crack growth resistance and mechanical strength. Additionally, the use or silica improves the scorch resistance of the rubber composition.

The silica has a nitrogen adsorption specific surface area ($N_2SA$) in the range of, for example, 50 to 200 $m^2/g$, preferably 80 to 150 $m^2/g$. The nitrogen adsorption specific surface area of silica heroin is determined by the BET method in accordance with ASTM D3037-81.

In the case of containing silica, the amount of silica per 100 parts by mass of the rubber component is preferably 5 to 35 parts by mass, and more preferably 5 to 20 parts by mass. When the amount of silica falls within the range mentioned above, the effects of the present invention can be more suitably achieved.

In the case of containing silica, the silica is preferably used together with a silane coupling agent. The silane coupling agent may be any silane coupling agent conventionally used in combination with silica in the rubber industry. Examples thereof include sulfide silane coupling agents such as bis(3-triethoxysilylpropyl)disulfide; mercapto silane coupling agents such as 3-mercaptopropyltrimethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents each as 3-nitropropyltrimethoxysilane; and chloro silane coupling agents such as 3-chloropropyltrimethoxysilane. In particular, sulfide silane coupling agents are preferred, and bis(3-triethoxysilylpropyl)disulfide is more preferred. The amount of silane coupling agent is preferably 5 to 15 parts by mass per 100 parts by mass of silica.

In addition to the ingredients mentioned above, the rubber composition for an inner sidewall layer (1) may appropriately contain other additives generally used to prepare rubber compositions, such as reinforcing fillers (e.g. clay), zinc oxide, stearic acid, processing aids, various antioxidants, waxes, softeners, plasticizers, tackifiers, vulcanizing agents (e.g. sulfur), and vulcanization accelerators.

The vulcanizing agent may be an organic peroxide or a sulfur vulcanizing agent. The organic peroxide may suitably be, for example, dicumyl peroxide, t-butylperoxybenzene, or di-t-butylperoxy-diisopropylbenzene. The sulfur vulcanizing agent may be, for example, sulfur or morpholine disulfide, and suitably sulfur.

Examples of the vulcanization accelerators include sulfonamide, thiazole, thiuram, thiourea, guanidine, dithiocarbamate, aldehyde-amine or aldehyde-ammonia, imidazoline, and xanthate vulcanization accelerators.

Examples of the softeners include, but are not limited to, oils such as mineral oils (e.g. aromatic oil, process oil, paraffinic oil). In the case of containing a softener, the amount of softener per 100 parts by mass of the rubber component is preferably 5 to 30 parts by mass, and more preferably 5 to 20 parts by mass. In the present invention, the amount of softener includes the amount of softeners contained in oil-extended rubbers.

The rubber composition for an inner sidewall layer (1) can be prepared by a conventional method. Specifically, for example, the above ingredients are kneaded with an apparatus such as a Banbury mixer, a kneader, and an open roll mill, and then vulcanized, whereby a rubber composition is prepared.

<Outer Sidewall Layer (2) Rubber>

The volume resistivity of the outer sidewall layer (2) rubber is preferably set to not less than $1.0 \times 10^8$ Ω·cm, more preferably not less than $1.0 \times 10^9$ Ω·cm. Then better fuel efficiency can be provided. The upper limit of the volume resistivity of the outer sidewall layer (2) rubber is not particularly limited, and is preferably not more than $1.0 \times 10^{16}$ Ω·cm, and more preferably not more than $1.0 \times 10^{14}$ Ω·cm.

The thickness of the outer sidewall layer (2) rubber is preferably 1.0 to 3.0 mm, and more preferably 1.0 to 2.5 mm. Then the effects of the present invention can be more suitably achieved.

The outer sidewall layer (2) rubber is prepared using a rubber composition for an outer sidewall layer (2).

(Rubber Composition for Outer Sidewall Layer (2))

Examples of rubbers that can be used in the rubber component of the rubber composition for an outer sidewall layer (2) include, but are not limited to, rubbers as mentioned for the rubber composition for an inner sidewall layer (1). In particular, NR and BR are preferred and a combination of NR and BR is more preferred because they provide good fuel efficiency end handling stability. The combined use of NR and BR can keep rolling resistance lower because of the characteristics of the rubber component, and further improve the dispersibility of carbon black, whereby fuel efficiency can be further improved.

The NR and BR are not particularly limited, and may suitably be as mentioned for the rubber composition for an inner sidewall layer (1).

In the case of containing NR, the amount of NR based on 100% by mass of the rubber component is preferably not less than 30% by mass, and more preferably not less than 40% by mass. The amount of NR is preferably not more than 70% by mass, and more preferably not more than 60% by mass. When the amount of NR falls within the range mentioned above, the effects of the present invention can be more suitably achieved.

In the case of containing BR, the amount of BR based on 100% by mass of the rubber component is preferably not less than 30% by mass, and more preferably not less than 40% by mass. The amount of BR is preferably not more than 70% by mass, and more preferably net mere than 60% by mass. When the amount of BR fails within the range mentioned above, the effects of the present invention can be more suitably achieved.

The rubber composition for an outer sidewall layer (2) preferably contains carbon black. The carbon black is not particularly limited, and may suitably be the carbon black (I).

In the case of containing carbon black, the amount of carbon black per 100 parts by mass of the rubber component is preferably not less than 5 parts by mass, more preferably not less than 15 parts by mass, and still more preferably not less than 30 parts by mass. If the amount is less than 5 parts by mass, sufficient handling stability may net be achieved. The amount is preferably not more than 80 parts by mass, and more preferably not more than 65 parts by mass. If the amount is more than 80 parts by mass, the carbon black is less likely to disperse and thus the fuel efficiency and durability tend to be poor.

In the present invention, a polybutadiene with a number average molecular weight (Mn) of 2000 to 15000 is preferably used. Then fuel efficiency and ozone resistance can be further improved.

In cases where the weight of a tire is reduced by reducing the thickness of a sidewall to a specific value or smaller, the volume of the sidewall rubber is also reduced with the reduction of the thickness of the sidewall; therefore, the total amount of antioxidant added to the sidewall rubber is reduced as well, which may lower the ozone resistance of the sidewall. To address this problem the amount of antioxidant can be increased to improve the ozone resistance, but this results in an increase in the amount of antioxidant per the amount of the rubber component, which may cause brown discoloration of the sidewall rubber and therefore poor appearance of the tire. When the polybutadiene is used, in contrast, the polybutadiene forms a thin film on the surface of the outer sidewall layer (2) rubber, which constitutes an outer-surface of the tire, to serve as a barrier layer, thus suitably enhancing ozone resistance. The barrier layer of the polybutadiene is less likely to crack compared to conventional waxes used in rubber compounds for tires, and is thus more effective to suitably enhance ozone resistance.

The polybutadiene has a number average molecular weight (Mn) of not less than 2000, preferably not less than 3000, and more preferably not less than 4000. Also, the Mn of the polybutadiene is not more than 15000, preferably not more than 12000, more preferably not more than 8000, and still more preferably not more than 6000. Then the effects (particularly, good fuel efficiency) of the present invention can be more suitably achieved and, at the same time, good ozone resistance can be provided.

The number average molecular weight (Mn) of the polybutadiene is determined by gel permeation chromatography (GPC) (GPC-8000 Series, produced by Tosoh Corporation; detector: differential refractometer; column: TSKGEL SUPERMULTIPORE HZ-M, produced by Tosoh Corporation) relative to polystyrene standards.

The polybutadiene may have a vinyl content of 0% by mass, and the vinyl content is preferably not less than 5% by mass, more preferably not less than 10% by mass, and still more preferably not less than 20% by mass. Also, the vinyl content of the polybutadiene is preferably not more than 70% by mass, more preferably not more than 50% by mass, and still more preferably not more than 40% by mass. Then the effects (particularly, good fuel efficiency) of the present invention can be more suitably achieved and, at the same time, good ozone resistance can be provided.

The vinyl content of the polybutadiene is determined by infrared absorption spectroscopy analysis.

In the case of containing the polybutadiene, the amount of the polybutadiene per 100 parts by mass of the rubber component is preferably not less than 2 parts by mass, and more preferably not less than 5 parts by mass. If the amount is less than 2 parts by mass, sufficient fuel efficiency and ozone resistance may not be provided. The amount is preferably not more than 35 parts by mass, more preferably not more than 25 parts by mass, and still more preferably not mere than 15 parts by mass. If the amount is more than 35 parts by mass, it tends to bleed more from the tire surface and thus deteriorate fuel efficiency.

In addition to the ingredients mentioned above, the rubber composition for an outer sidewall layer (2) may appropriately contain additives generally used to prepare rubber compositions, as mentioned for the rubber composition for an inner sidewall layer (1).

The softener may be as mentioned for the rubber composition for an inner sidewall layer (1). In the case of containing a softener, the amount of softener per 100 parts by mass of the rubber component is preferably 3 to 30 parts by mass, and more preferably 5 to 20 parts by mass.

The rubber composition for an outer sidewall layer (2) can be prepared by a conventional method as mentioned for the rubber composition for an inner sidewall layer (1).

<Carcass>

The volume resistivity of the carcass cord topping (3) rubber is preferably set to not less than $1.0 \times 10^8$ Ω·cm, more preferably not less than $1.0 \times 10^9$ Ω·cm. Then better fuel efficiency can be provided. The upper limit of the volume resistivity of the carcass cord topping (3) rubber is not particularly limited, and is preferably not more than $1.0 \times 10^{16}$ Ω·cm, and more preferably not more than $1.0 \times 10^{14}$ Ω·cm.

The thickness of the carcass is preferably 0.5 to 4 mm, and more preferably 1.2 to 3 mm. Then the effects of the present invention can be more suitably achieved.

The carcass is prepared by coating a carcass cord with a rubber composition for a carcass cord topping (3).

(Rubber Composition for Carcass Cord Topping (3))

Examples of rubbers that can be used in the rubber component of the rubber composition for a carcass cord topping (3) include, but are not limited, rubbers as mentioned for the rubber composition for an inner sidewall layer (1). In particular, NR and SBR are preferred and a combination of NR and SBR is more preferred because they provide good fuel efficiency and handling stability.

The NR is not particularly limited, and may suitably be as mentioned for the rubber composition for an inner sidewall layer (1).

In the case of containing NR, the amount of NR based on 100% by mass of the rubber component is preferably not less than 30% by mass, and more preferably not less than 40% by mass. The amount of NR is preferably not more than 70% by mass, and more preferably not more than 60% by mass. When the amount of NR falls within the range mentioned above, the effects of the present invention can be more suitably achieved.

The SBR is not particularly limited, and may suitably be as mentioned for the rubber composition for an inner sidewall layer (1). The vinyl content is preferably 5 to 50% by mass, and more preferably 10 to 35% by mass.

In the case of containing SBR, the amount of SBR based on 100% by mass of the rubber component is preferably not less than 30% by mass, and more preferably not less than 40% by mass. The amount of SBR is preferably not more than 70% by mass, and more preferably not more than 60% by mass. When the amount of SBR falls within the range mentioned above, the effects of the present invention can be more suitably achieved.

The rubber composition for a carcass cord topping (3) preferably contains carbon black. The carbon black is not particularly limited, and may suitably be the carbon black (I).

In the case of containing carbon black, the amount of carbon black per 100 parts by mass of the rubber component is preferably not less than 5 parts by mass, more preferably not less than 15 parts by mass, still more preferably not less than 30 parts by mass, and particularly preferably not less than 40 parts by mass. If the amount is less than 5 parts by mass, sufficient handling stability may not be achieved. The amount is preferably not more than 80 parts by mass, and more preferably not more than 65 parts by mass. If the amount is more than 80 parts by mass, the carbon black is less likely to disperse and thus the fuel efficiency and durability tend to be poor.

In addition to the ingredients mentioned above, the rubber composition for a carcass cord topping (3) may appropriately contain additives generally used to prepare rubber compositions, such as reinforcing fillers (e.g. clay), zinc oxide, stearic acid, processing aids, various antioxidants, waxes, softeners, plasticizers, tackifiers, vulcanizing agents (e.g. sulfur), and vulcanization accelerators.

The softener may be as mentioned for the rubber composition for an inner sidewall layer (1). In the case of containing a softener, the amount of softener per 100 parts by mass of the rubber component is preferably 3 to 30 parts by mass, and more preferably 10 to 25 parts by mass.

The rubber composition for a carcass cord topping (3) can be prepared by a conventional method as mentioned for the rubber composition for an inner sidewall layer (1).

In the present invention, the complex elastic modulus $E^*(1)$ of the rubber composition for an inner sidewall layer (1) and the complex elastic modulus $E^*(2)$ of the rubber composition for an outer sidewall layer (2) satisfy a relation (1) below, and the complex elastic modulus $E^*(3)$ of the rubber composition for a carcass cord topping (3) and the complex elastic modulus $E^*(1)$ of the rubber composition for an inner sidewall layer (1) satisfy a relation (2) below. Then a pneumatic tire can be preceded which is capable or ensuring conductivity (preventing accumulation or static electricity) while being reduced in weight, and further having good fuel efficiency and handling stability. In the present invention, the complex elastic moduli E* are measured at 70° C. according to the method described later in examples.

$$1.15 \leq E^*(1)/E^*(2) \leq 3.00 \quad (1)$$

$$1.00 \leq E^*(1)/E^*(3) \leq 2.50 \quad (2)$$

In the relation (1), the lower limit is preferably net less than 1.30, more preferably not less than 1.60, still more preferably act less than 1.60, and particularly preferably not less than 2.00. Conversely, the upper limit is preferably not more than 2.80, more preferably not more than 2.60, still more preferably not more than 2.40, and particularly preferably not more than 2.20. Then the effects of the present invention can be more suitably achieved.

In the relation (2), the lower limit is preferably not less than 1.30, more preferably not lees than 1.30, still more preferably not less than 1.60, and particularly preferably not less than 1.80. Conversely, the upper limit is preferably not more than 2.40, more preferably not more than 2.60, still more preferably not more than 2.20, and particularly preferably not more than 2.10. Then the effects of the present invention can be more suitably achieved. In cases where an inner sidewall layer (1) rubber having a high elastic modulus is combined with the carcass cord topping (3) rubber which is adjacent to a carcass cord having an elastic modulus higher than that of rubbers, an increased amount of strain is likely to be applied and the carcass cord topping (3) rubber thus tends to be stressed. Hence, in view of the strength of the rubber, the ratio of the stiffness of the inner sidewall layer (1) rubber to the stiffness of the carcass cord topping (3) rubber is preferably set to be small, and the acceptable maximum stiffness ratio is smaller than that of [the inner sidewall layer (1) rubber]/[the outer sidewall layer (2) rubber].

<Tread Rubber, Breaker Rubber>

The volume resistivity of each of the tread rubber and the breaker rubber of the tire is preferably set to not less than $1 \times 10^8$ Ω·cm. The formulations of the tread rubber and the breaker rubber may be ones generally used in the tire industry.

<Bead Portion Rubber>

The bead portion rubber herein, which is located at a region of the bead portion that is in contact with a rim flange, conceptually includes clinch rubbers, chafers, and rubber chafers. When a tire runs, the driving force is transmitted from the rim via the bead portion rubber, and at this time, static electricity is likely to be generated due to the friction between the rim and the bead portion rubber. Since the bead portion rubber has a contact area with the inner sidewall layer rubber, the static electricity can be efficiently discharged to the ground contact surface through the inner sidewall layer rubber. In FIGS. 1 to 3, the clinch rubber and the chafer or rubber chafer are electrically connected to the inner sidewall layer (1) rubber 10.

The bead portion rubber preferably has a volume resistivity of less than $1 \times 10^8$ Ω·cm. Particularly in FIGS. 1 and 2, since the bead portion forms a part of the conductive layer, its volume resistivity of less then $1 \times 10^8$ Ω·cm leads to a tire with good conductivity. The volume resistivity of the bead portion rubber is preferably not more than $1 \times 10^7$ Ω·cm, more preferably not more than $1 \times 10^{6.5}$ Ω·cm, still more preferably not more than $1 \times 10^6$ Ω·cm, and particularly preferably not more than $1 \times 10^{5.5}$ Ω·cm. The lower limit of the volume resistivity of the bead portion rubber is not particularly limited. Since the bead portion rubber, i.e., the clinch rubber, chafer, and rubber chafer, needs to have abrasion resistance, stiffness, and hardness, the electrical resistance thereof can be adjusted based on the method for formulating the inner sidewall layer (1) rubber in addition to the formulation design mentioned above.

<Conducting Rubber>

In the pneumatic tire 100 according to an embodiment of the present invention (see FIG. 1), the conducting rubber forms a part of the conductive layer. In FIG. 1, the conducting rubber is embedded in the tread portion, and one portion of the rubber is partly exposed on the ground contact surface of the tire while another portion thereof is connected to (or in contact with) the inner sidewall layer (1) rubber. Thus, the static electricity generated during the traveling of the pneumatic tire can be efficiently discharged toward the ground contact surface. FIG. 1 shows a structure in which one conducting rubber 11 is embedded at the center of the tread portion, although two or more conducting rubbers may be embedded. The conducting rubber has a width in the tire width direction of, for example, 0.2 to 10 mm, preferably 0.9 to 1.5 mm. If the width is less than 0.2 mm, the conducting effect is small. Conversely, if the width is more than 10 mm, the ground contact area of the conducting rubber in the tread portion relatively increases, which may deteriorate the ground contact properties, rolling resistance properties and abrasion resistance. The conducting rubber is preferably formed as a continuous layer in the tire circumferential direction although it may be formed intermittently in the tire circumferential direction.

The volume resistivity of the conducting rubber is preferably set lower than those of the tread rubber, the breaker rubber, and the outer sidewall layer (2) rubber; specifically, it is preferably less than $1 \times 10^8$ Ω·cm. A volume resistivity of less than $1 \times 10^8$ Ω·cm leads to an improvement in the conductivity of the tire, whereby the effect of discharging static electricity can be provided. The volume resistivity of the conducting rubber is more preferably not more than $1 \times 10^7$ Ω·cm, still more preferably not more than $1 \times 10^6$ Ω·cm, and particularly preferably not more than $1 \times 10^{5.5}$ Ω·cm. The lower limit of the volume resistivity of the conducting rubber is not particularly limited.

The conducting rubber may be of substantially the same formulation as that of the inner sidewall layer (1) rubber, and carbon black and/or silica as mentioned above may be added. Moreover, in view of improving ground contact properties, the conducting rubber may have a formulation designed to provide conductivity based on the formulation of the tread rubber.

<Rubber Formulations of Conducting Rubber, Chafer Rubber, Clinch Rubber, Tread Rubber, and Breaker Rubber>

The conducting rubber, the chafer rubber, the clinch rubber, the tread rubber, and the breaker rubber of the pneumatic tire of the present invention may be formed, for example, from the following rubber compositions.

Examples of rubber materials that can be used in the rubber component of each of these rubber compositions include these listen for the rubber composition for an inner sidewall layer (1). Diene rubbers are preferred as the rubber component for the conducting rubber, the chafer rubber, the clinch rubber, the tread rubber, and the breaker rubber. In particular, natural rubber, styrene-butadiene rubber, butadiene rubber, isoprene rubber, epoxidized natural rubber and the like are preferred.

In addition to the ingredients mentioned above, the rubber composition may appropriately contain additives generally used to prepare rubber compositions, such as reinforcing fillers (e.g. carbon black, silica, clay), zinc oxide, stearic acid, processing aids, various antioxidants, softeners, plasticizers, tackifiers, vulcanizing agents (e.g. sulfur), and vulcanization accelerators.

The pneumatic tire of the present invention can be prepared using the rubber compositions mentioned above by a conventional method. Specifically, each of unvulcanized rubber compositions containing the ingredients mentioned above is extruded and processed into the shape of a tire component such as an inner sidewall layer (1), an outer sidewall layer (2), or a carcass (in the case of a carcass, the upper and lower surfaces of carcass cords are coated with a sheet-shaped unvulcanized rubber composition for a carcass cord topping (3) under pressure from above and below and formed into the shape of a carcass), and then arranged together with other tire components in a conventional manner on a tire building machine to build an unvulcanized tire. The unvulcanized tire is heated and pressurized in a vulcanizer to give a tire.

Examples of the carcass cords include cords formed of single organic fiber yarns twisted; and composite cords formed of two or more different types of organic fiber yarns twisted. Examples of the organic fibers include nylon 66 fibers, aramid fibers, nylon fibers, polyethylene naphthalate (PEN) fibers, polyethylene (PE) fibers, and polyethylene terephthalate (PET) fibers.

The pneumatic tire of the present invention can be used as a tire for passenger cars, a tire for trucks and buses, a tire for two-wheelers, a high performance tire, and the like. The high performance tire herein refers to a tire particularly excellent in grip performance, and conceptually includes racing tires for use in racing vehicles.

EXAMPLES

The present invention will now be described in more detail with reference to the following examples. However, the present invention is not limited to only the examples.

The chemical agents used in the examples and comparative examples are listed below.

BR: BR150B (cis content: 95% by mass) produced by UBE INDUSTRIES, LTD.
NR: TSR20
SBR1: NS116 (styrene content: 20% by mass, vinyl content: 60% by mass) produced by ZEON CORPORATION
SBR2: Tufdene T3830 (styrene content: 33% by mass, vinyl content; 34% by mass, oil content: 37.5 parts by mass per 100 parts by mass of rubber solids) produced by ZEON CORPORATION
SBR3: Nipol 1502 (styrene content: 23.5% by mass, vinyl content; 18% by mass) produced by ZEON CORPORATION
Carbon black 1: N550 ($N_2$ SA: 43 m²/g, DBP oil absorption: 121 ml/100 g) produced by Cabot Japan K.K.
Carbon black 2: N220 ($N_2$SA: 115 m²/g, DBP oil absorption: 114 ml/100 g) produced by Cabot Japan K.K.
Carbon black 3: Ketjen Black EC600KD ($N_2$SA: 1270 m²/g, DBP oil absorption: 495 ml/100 g) produced by Ketjen Black International
Silica 1: Silica 115GR ($N_2$SA: 115 m²/g produced by Rhodia Japan, Ltd.
Silane coupling agent 1: Si75 (bis(3-triethoxysilylpropyl) disulfide) produced by Degussa
Oil: Diana Process AH40 produced by Idemitsu Kosan Co., Ltd.
Zinc oxide: Zinc oxide produced by Mitsui Mining and Smelting Co., Ltd.
Stearic acid: Stearic acid "TSUBAKI" produced by NOF Corp.
Wax: SUNNOC N produced by OUCHI SHINKO CHEMICAL INDUSTRIAL CO., LTD.
Antioxidant: Antigene 6C produced by Sumitomo Chemical Co., Ltd.
Sulfur: Mu-cron OT20 (insoluble sulfur) produced by SHIKOKU CHEMICALS CORPORATION
Vulcanization accelerator: NOCCELER NS-P (N-t-butyl-2-benzothiazolylsulfenamide) produced by OUCHI SHINKO CHEMICAL INDUSTRIAL CO., LTD.
Low-molecular-weight polybutadiene 1: Ricon 131 (Mn: 4500, vinyl content: 28% by mass) produced by CRAY VALLEY
Low-molecular-weight polybutadiene 2: Ricon 150 (Mn: 3900, vinyl content: 70% by mass) produced by CRAY VALLEY SBR1500: SBR1500 produced by Sumitomo Chemical Co., Ltd.

Carbon black N220: DIABLACK I ($N_2SA$: 114 $m^2/g$) produced by Mitsubishi Chemical Corporation Silica 2: ULTRASIL VN3 ($N_2SA$: 175 $m^2/g$) produced by Degussa Silane coupling agent 2: Si69 (bis(3-triethoxysilylpropyl)tetrasulfide) produced by Degussa Cobalt stearate: COST-S produced by Nippon Mining & Metals Co., Ltd.

Insoluble sulfur: Sanfel EX produced by SANSHIN CHEMICAL INDUSTRY CO., LTD.

Carbon blank 4: PRINTEX XE2B ($N_2SA$: 1000 $m^2/g$, DBP: 420 ml/100 g) produced by Degussa Aromatic oil: Process X-140 produced by Japan Energy Corporation Resin: SP1068 resin produced by NIPPON SHOKUBAI CO., LTD.

<Preparation of Inner Sidewall Layer (1) Rubber>

According to each of the formulations shown in Table 1, chemical agents other than sulfur and a vulcanization accelerator were kneaded in a 1.7-L Banbury mixer produced by KOBE STEEL, LTD, at 150° C. for three minutes. Thereafter, the sulfur and vulcanization accelerator were added to the kneaded mixture and the resulting mixture was kneaded using an open roll mill at 95° C. for three minutes. Thus, unvulcanized rubber compositions for an inner sidewall layer (1) A to G were prepared. Then, each unvulcanized rubber composition was processed into the shape of an inner sidewall layer (1) using an extruder.

<Preparation of Outer Sidewall Layer (2) Rubber>

According to each of the formulations shown in Table 1, chemical agents other than sulfur and a vulcanization accelerator were kneaded in a 1.7-L Banbury mixer produced by KOBE STEEL, LTD. at 150° C. for three minutes. Thereafter, the sulfur and vulcanization accelerator were added to the kneaded mixture and the resulting mixture was kneaded using an open roll mill at 95° C. for three minutes. Thus, unvulcanized rubber compositions for an outer sidewall layer (2) H to K were prepared. Then, each unvulcanized rubber composition was processed into the shape of an outer sidewall layer (2) using an extruder.

<Preparation of Carcass Cord Topping (3) Rubber>

According to each of the formulations shown in Table 1, chemical agents other than sulfur and a vulcanization accelerator were kneaded in a 1.7-L Banbury mixer produced by KOBE STEEL, LTD. at 150° C. for three minutes. Thereafter, the sulfur and vulcanization accelerator ware added to the kneaded mixture and the resulting mixture was kneaded using an open roll mill at 95° C. for three minutes. Thus, unvulcanized rubber compositions for a carcass cord topping (3) L and M were prepared. Each unvulcanized rubber composition was formed into a rubber sheet using a calender roll, and carcass cords (made of polyester, 1670 dtex/2) were sandwiched by the rubber sheets to prepare a carcass.

<Preparation of Conducting Rubber and Tread Rubber>

According to each of the formulations shown in Tables 2 and 3, chemical agents other than sulfur and a vulcanization accelerator were kneaded in a 1.7-L Banbury mixer produced by KOBE STEEL, LTD. at 150° C. for three minutes. Thereafter, the sulfur and vulcanization accelerator were added to the kneaded mixture and the resulting mixture was kneaded using an open roll mill at 95° C. for three minutes. Thus, unvulcanized rubber compositions for a conducting rubber and for a tread were prepared. Then the unvulcanized rubber compositions were processed into the shape of a conducting rubber and a tread rubber, respectively, using an extruder.

<Preparation of Breaker>

According to the formulation shown in Table 4, chemical agents other than sulfur and a vulcanization accelerator were kneaded in a 1.7 L-Banbury mixer produced by KOBE STEEL, LTD. at 150° C. for three minutes. Thereafter, the sulfur and vulcanization accelerator were added to the kneaded mixture and the resulting mixture was kneaded using an open roll mill at 95° C. for three minutes. Thus, an unvulcanized rubber composition for a breaker cord topping was prepared. The unvulcanized rubber composition was formed into a rubber sheet using a calender roll, and breaker cords (2+2 structure, cord diameter 0.23 mm) were sandwiched by the rubber sheets to prepare a breaker.

<Preparation of Clinch Rubber and Chafer Rubber>

The chemical agents shown in the step 1 of Table 5 were kneaded in a 1.7 L-Banbury mixer produced by KOBE STEEL, LTD. at 150° C. for three minutes. Thereafter, the chemical agents shown in the step 2 were added to the kneaded mixture and the resulting mixture was kneaded at 150° C. for three minutes. Further, the resultant mixture was kneaded in a 1.7-L Banbury mixer produced by KOBE STEEL, LTD, at 150° C. for three minutes (rekneading step). Then, sulfur and a vulcanization accelerator were added to the kneaded mixture obtained in the rekneading step, and the contents were kneaded using an open roll mill at 95° C. for three minutes. Thus, unvulcanized rubber compositions for a clinch and for a chafer were prepared. Then the unvulcanized rubber compositions were processed into the shape of a clinch rubber and a chafer rubber, respectively, using an extruder.

<Preparation of Test Vulcanized Rubber Slab>

Each of the unvulcanized rubber compositions shown in Tables 1 to 5 was vulcanized for 20 minutes at 160° C. to prepare a vulcanized rubber slab sheet (2 mm×130 mm×130 mm). The vulcanized rubber slab sheets were evaluated as follows. Tables 1 to 5 show the results.

<Volume Resistivity of Rubber Composition>

A 2-mm thick test piece in size of 15 cm×15 cm was prepared from each of the vulcanized rubber slab sheets (rubber compositions in Tables 1 to 5), and the volume resistivity of each rubber composition was measured using R8340A, an instrument for measuring electrical resistance, produced by ADVANTEST CORPORATION at an applied voltage of 1000 V under constant temperature and humidity conditions (temperature: 23° C., relative humidity: 55%) with other conditions as set forth in JIS K 6271. Tables 1 to 5 show the common logarithms of the results. A larger value indicates a higher volume resistivity of the rubber composition, meaning lower conductivity.

<Complex Elastic Modulus (E*) and Loss Tangent (tan δ) of Rubber Composition)>

The complex elastic modulus (E*) and the loss tangent (tan δ) of each of the vulcanized rubber slab sheets (rubber compositions in Tables 1 to 5) were measured at a dynamic strain amplitude of 1%, a frequency of 10 Hz, and a temperature of 70° C. using a spectrometer produced by Ueshima Seisakusho Co., Ltd. Higher E* indicates higher rubber stiffness. Lower tan δ indicates better fuel efficiency.

<Preparation of Pneumatic Tire>

The tire components prepared according to the rubber formulations in Tables 1 to 5 and other tire components prepared by conventional methods including kneading in an internal mixer and extrusion calendering were used to prepare an unvulcanized tire in accordance with Table 6. The unvulcanized tire was vulcanized at a pressure of 18 kgf and a temperature of 150° C. for 30 minutes. Thus, a pneumatic tire (test tire) having a tire size of 195/65R15 and the structure shown in FIG. 1 was produced.

The conducting rubber used had a width of 3 mm and its structure was such that it was continuously formed in the circumferential direction of the tire. Moreover, the entire surface of the conducting rubber in the tire width direction was in contact with the inner sidewall layer (1) rubber, and the clinch rubber was in contact with the inner sidewall layer (1) rubber by a width of 5 mm or more along the shape of the carcass.

The test tires thus prepared were evaluated as follows. Table 6 shows the results.

<Rolling Resistance Coefficient>

The rolling resistance of each tire was measured with a rolling resistance testing machine produced by STI by running the tire at a load of 4.7 kN, a tire inner pressure of 2.0 MPa, and a speed of 80 km/h. The rolling resistance result of each tire is expressed as an index (rolling resistance coefficient) relative to that of Comparative Example 1 (=100), using the following equation. A higher rolling resistance coefficient indicates lower tire rolling resistance, meaning better fuel efficiency.

(Rolling resistance coefficient)=(Rolling resistance in Comparative Example 1)/(Rolling resistance in each formulation)×100

<Handling Stability>

The test tire was mounted on every wheel of an IF (front-engine front-wheel-drive) car (engine size: 2000 cc) made in Japan. The car was driven on a test course of Sumitomo Rubber Industries, Ltd. in Okayama, Japan, and sensory evaluation was performed by a driver to evaluate handling stability. The evaluation was made on a scale of 1 to 10 (the best), relative to Comparative Example 1 taken as 6. A higher rating indicates better handling stability.

<Ozone Resistance>

A test piece (thickness: 2 map length: 60 map width: 10 mm) was prepared from each vulcanized rubber slab sheet in accordance with JIS K6259. The test piece was subjected to a static ozone degradation test in which the test piece was stretched to 30% elongation and then allowed to stand for 24 hours at an ozone concentration of 50 pphm (ambient temperature 40° C.). The presence or absence of cracks formed during the test was visually observed, and the ozone resistance result of each sheet is expressed as an index relative to Comparative Example 1 (=100). A higher index indicates better ozone resistance.

<Electrical Resistance of Tire>

The tread portion of each tire at an internal pressure of 2.0 MPa and a load of 4.7 kN was mounted on an iron plate, and the volume resistivity (volume resistance) between the rim portion and the iron plate was measured at an applied voltage of 100 V. In cases where the measured volume resistivity is not more than $1.0 \times 10^8$ Ω·cm, it is considered that good conductivity is ensured, and thus such a tire is evaluated as "Good".

<Durability (Drum Durability Test)>

Each test tire was run on a drum under over-load conditions, i.e., with 140% of the maximum load (maximum air pressure conditions) according to the JIS. The mileage at which the tire was broken was determined. The mileage of each tire is expressed as an index relative to that of a reference tire (Comparative Example 1) (=100). A higher index indicates better durability.

(Durability index)=(Mileage of each tire)/(Mileage of reference tire)×100

TABLE 1

| | | Inner sidewall layer (1) Inner sidewall layer (1) rubber | | | | | | | Outer sidewall layer (2) Outer sidewall layer (2) rubber | | | | Carcass Carcass cord topping (3) rubber | |
|---|---|---|---|---|---|---|---|---|---|---|---|---|---|---|
| | | A | B | C | D | E | F | G | H | I | J | K | L | M |
| Amount (part(s) by mass) | BR | 50 | 50 | 50 | 50 | 50 | 40 | 40 | 50 | 50 | 50 | 50 | — | — |
| | NR | 50 | 50 | 50 | 50 | 50 | 40 | 40 | 50 | 50 | 50 | 50 | 50 | 50 |
| | SBR1 | — | — | — | — | — | 20 | — | — | — | — | — | — | — |
| | SBR2 | — | — | — | — | — | — | 27.5 | — | — | — | — | — | — |
| | SBR3 | — | — | — | — | — | — | — | — | — | — | — | 50 | 50 |
| | Carbon black 1 | 50 | 50 | 40 | 50 | — | 50 | 50 | 50 | 35 | 50 | 50 | 50 | 35 |
| | Carbon black 2 | — | — | — | — | 50 | — | — | — | — | — | — | — | — |
| | Carbon black 3 | 5 | 10 | 5 | 20 | 5 | 5 | 5 | — | — | — | — | — | — |
| | Silica 1 | — | — | — | — | — | 10 | 10 | — | — | — | — | — | — |
| | Silane coupling agent 1 | — | — | — | — | — | 0.8 | 0.8 | — | — | — | — | — | — |
| | Oil | 15 | 15 | 15 | 10 | 15 | 10 | 2.5 | 15 | 3 | 15 | 15 | 20 | 6 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 |
| | Stearic acid | 2 | 2 | 2 | 2 | 2 | 2 | 2 | 2 | 2 | 2 | 2 | 2 | 2 |
| | Wax | 1.5 | 1.5 | 1.5 | 1.5 | 1.5 | 1.5 | 1.5 | 1.5 | 1.5 | 1.5 | 1.5 | 1.5 | 1.5 |
| | Antioxidant | 2 | 2 | 2 | 2 | 2 | 2 | 2 | 2 | 2 | 2 | 2 | 2 | 2 |
| | Sulfur | 1.5 | 1.5 | 1.5 | 1.5 | 1.5 | 1.5 | 1.5 | 1.5 | 1.5 | 1.5 | 1.5 | 1.5 | 1.75 |
| | Vulcanization accelerator | 1.5 | 1.5 | 1.5 | 1.5 | 1.5 | 1.5 | 1.5 | 1.5 | 1.5 | 1.5 | 1.5 | 1.5 | 1.5 |
| | Low-molecular-weight polybutadiene 1 | — | — | — | — | — | — | — | — | — | 10 | — | — | — |
| | Low-molecular-weight polybutadiene 2 | — | — | — | — | — | — | — | — | — | — | 10 | — | — |
| Evaluation results | Volume resistivity | 5.9 | 5.2 | 6.1 | 4.2 | 4.5 | 5.8 | 5.8 | 12.6 | 14.2 | 12.5 | 12.5 | 12.2 | 12.1 |
| | Complex elastic modulus E* | 4 | 7 | 3.5 | 12 | 7 | 4 | 4 | 3.4 | 3.3 | 3.5 | 3.8 | 3.5 | 3.5 |
| | tan δ | 0.2 | 0.23 | 0.19 | 0.34 | 0.26 | 0.18 | 0.22 | 0.15 | 0.1 | 0.16 | 0.14 | 0.25 | 0.21 |

TABLE 2

Conducting rubber

|  |  | Formulation |
|---|---|---|
| Amount (part(s) by mass) | NR | 30 |
|  | SBR1500 | 70 |
|  | Carbon black N220 | 55 |
|  | Wax | 1.5 |
|  | Antioxidant | 2 |
|  | Stearic acid | 1 |
|  | Zinc oxide | 3 |
|  | Sulfur | 1.8 |
|  | Vulcanization accelerator | 1 |
| Volume resistivity |  | 5.4 |

TABLE 3

Tread rubber

|  |  | Formulation |
|---|---|---|
| Amount (part(s) by mass) | SBR1500 | 100 |
|  | Silica 2 | 50 |
|  | Silane coupling agent 2 | 5 |
|  | Wax | 1 |
|  | Antioxidant | 2 |
|  | Stearic acid | 1 |
|  | Zinc oxide | 3 |
|  | Sulfur | 1.5 |
|  | Vulcanization accelerator | 1 |
| Volume resistivity |  | 13.5 |

TABLE 4

Breaker rubber

|  |  | Formulation |
|---|---|---|
| Amount (part(s) by mass) | NR | 100 |
|  | Silica 2 | 55 |
|  | Silane coupling agent 2 | 5.5 |
|  | Antioxidant | 2 |
|  | Cobalt stearate | 2 |
|  | Stearic acid | 1 |
|  | Zinc oxide | 10 |
|  | Insoluble sulfur | 5.5 |
|  | Vulcanization accelerator | 0.9 |
| Volume resistivity |  | 14.0 |

TABLE 5

Clinch rubber, chafer rubber

|  |  |  | Formulation |
|---|---|---|---|
| Amount (part(s) by mass) | Step 1 | NR | 60 |
|  |  | Silica 2 | 50 |
|  |  | Silane coupling agent 2 | 4.8 |
|  |  | Carbon black 4 | 15 |
|  |  | Aromatic oil | 5 |
|  |  | Resin | 3 |
|  | Step 2 | BR | 40 |
|  |  | Silica 2 | 10 |
|  |  | Stearic acid | 2.5 |
|  |  | Zinc oxide | 3 |
|  |  | Antioxidant | 3 |
|  |  | Wax | 1.2 |
|  | Step 3 | Rekneading | Performed |
|  | Step 4 | Sulfur | 1.5 |
|  |  | Vulcanization accelerator | 0.7 |
| Volume resistivity |  |  | 5.5 |

TABLE 6

|  |  | Comparative Example |  |  |  |  | Example |  |  |
|---|---|---|---|---|---|---|---|---|---|
|  |  | 1 | 2 | 3 | 4 | 5 | 1 | 2 | 3 |
| Thickness of sidewall [mm] |  | 3.5 | 2.5 | 2.5 | 2.5 | 2.5 | 2.5 | 2.5 | 2.5 |
| Inner sidewall layer (1) |  | C | C | D | B | B | A | B | B |
| Complex elastic modulus E* (1) |  | 3.5 | 3.5 | 12 | 7 | 7 | 4 | 7 | 7 |
| tan δ |  | 0.19 | 0.19 | 0.34 | 0.23 | 0.23 | 0.2 | 0.23 | 0.23 |
| Thickness [mm] |  | 0.3 | 0.3 | 0.3 | 0.15 | 1.5 | 0.3 | 0.3 | 0.5 |
| Outer sidewall layer (2) |  | H | H | H | H | H | H | H | H |
| Complex elastic modulus E* (2) |  | 3.4 | 3.4 | 3.4 | 3.4 | 3.4 | 3.4 | 3.4 | 3.4 |
| tan δ |  | 0.15 | 0.15 | 0.15 | 0.15 | 0.15 | 0.15 | 0.15 | 0.15 |
| Carcass cord topping (3) rubber |  | L | L | L | L | L | L | L | L |
| Complex elastic modulus E* (3) |  | 3.5 | 3.5 | 3.5 | 3.5 | 3.5 | 3.5 | 3.5 | 3.5 |
| tan δ |  | 0.25 | 0.25 | 0.25 | 0.25 | 0.25 | 0.25 | 0.25 | 0.25 |
| Thickness of carcass [mm] |  | 2.8 | 2.8 | 2.8 | 2.8 | 2.8 | 2.8 | 2.8 | 2.8 |
| E* (1)/E* (2) Relation (1) |  | 1.03 | 1.03 | 3.53 | 2.06 | 2.06 | 1.18 | 2.06 | 2.06 |
| E* (1)/E* (3) Relation (2) |  | 1.00 | 1.00 | 3.43 | 2.00 | 2.00 | 1.14 | 2.00 | 2.00 |
| Results of evaluation of tire |  |  |  |  |  |  |  |  |  |
| Evaluation results | Rolling resistance coefficient (RRC) | 100 | 105 | 97 | 107 | 86 | 105 | 103 | 102 |
|  | Handling stability | 6 | 5.5 | 6.5 | 5.5 | 6.5 | 6 | 6.25 | 6.5 |
|  | Ozone resistance | 100 | — | — | — | — | — | — | — |
|  | Electrical resistance not more than $1.0 \times 10^8$ Ω·cm | Good | Good | Good | Poor | Good | Good | Good | Good |
|  | Durability | 100 | 102 | 96 | 100 | 97 | 102 | 106 | 108 |

|  |  | Example |  |  |  |  |  |  |
|---|---|---|---|---|---|---|---|---|
|  |  | 4 | 5 | 6 | 7 | 8 | 9 | 10 |
| Thickness of sidewall [mm] |  | 2.5 | 2.5 | 2.5 | 2.5 | 2.5 | 2.5 | 2.5 |
| Inner sidewall layer (1) |  | E | A | B | F | G | B | B |
| Complex elastic modulus E* (1) |  | 7 | 4 | 7 | 4 | 4 | 7 | 7 |
| tan δ |  | 0.26 | 0.2 | 0.23 | 0.18 | 0.22 | 0.23 | 0.23 |
| Thickness [mm] |  | 0.3 | 0.3 | 0.3 | 0.3 | 0.3 | 0.3 | 0.3 |

TABLE 6-continued

| | | | | | | | | |
|---|---|---|---|---|---|---|---|---|
| Outer sidewall layer (2) | | H | I | I | H | H | J | K |
| | Complex elastic modulus E* (2) | 3.4 | 3.3 | 3.3 | 3.4 | 3.4 | 3.5 | 3.8 |
| | tan δ | 0.15 | 0.1 | 0.1 | 0.15 | 0.15 | 0.16 | 0.14 |
| Carcass cord topping (3) rubber | | L | M | M | L | L | L | L |
| | Complex elastic modulus E* (3) | 3.5 | 3.5 | 3.5 | 3.5 | 3.5 | 3.5 | 3.5 |
| | tan δ | 0.25 | 0.21 | 0.21 | 0.25 | 0.25 | 0.25 | 0.25 |
| | Thickness of carcass [mm] | 2.8 | 2.8 | 2.8 | 2.8 | 2.8 | 2.8 | 2.8 |
| E* (1)/E* (2) Relation (1) | | 2.06 | 1.21 | 2.12 | 1.18 | 1.18 | 2.00 | 1.84 |
| E* (1)/E* (3) Relation (2) | | 2.00 | 1.14 | 2.00 | 1.14 | 1.14 | 2.00 | 2.00 |
| Results of evaluation of tire | | | | | | | | |
| Evaluation results | Rolling resistance coefficient (RRC) | 100 | 108 | 106 | 105 | 102 | 104 | 105 |
| | Handling stability | 6.5 | 6 | 6.25 | 6 | 6 | 6 | 6 |
| | Ozone resistance | — | — | — | — | — | 124 | 103 |
| | Electrical resistance not more than $1.0 \times 10^8$ Ω · cm | Good | Good | Good | Good | Good | Good | Good |
| | Durability | 104 | 104 | 108 | 105 | 103 | 104 | 105 |

Table 6 shows that conductivity was ensured (accumulation of static electricity was prevented) while reducing the weight of a tire, and further, good fuel efficiency and handling stability were achieved in the examples including a carcass and a sidewall that includes a laminate of two or more rubber layers including an inner sidewall layer (1), which is located closest to the carcass, and an cuter sidewall layer (2), which constitutes an outer surface of a tire, wherein the sidewall has a thickness of not more than 3.0 mm, and the inner sidewall layer (1) has a thickness of 0.2 to 1.0 mm; the rubber composition for an inner sidewall layer (1) has a volume resistivity of not more than a specific value; and the complex elastic modulus E*(1) of the rubber composition for an inner sidewall layer (1), the complex elastic modulus E*(2) of the rubber composition for an outer sidewall layer (2), and the complex elastic modulus E*(3) of the rubber composition for a carcass cord topping (3) satisfy specific relations.

REFERENCE SIGNS LIST

1 Tread rubber
2 Outer sidewall layer (2) rubber
3 Breaker rubber
4 Inner liner
5 Bead apex
6 Bead core
7 Carcass
8 Chafer rubber
9 Clinch rubber
10 Inner sidewall layer (1) rubber
11 Conducting rubber
12 Band
100 Pneumatic tire
200 Pneumatic tire
300 Pneumatic tire
R Rim

The invention claimed is:

1. A pneumatic tire, comprising a sidewall and a carcass,
the sidewall comprising a laminate of two or more rubber layers including an inner sidewall layer, which is located closest to the carcass, and an outer sidewall layer, which constitutes an outer surface of the tire,
the inner sidewall layer comprising a rubber composition for an inner sidewall layer,
the outer sidewall layer comprising a rubber composition for an outer sidewall layer,
the carcass comprising a carcass cord topped with a rubber composition for a carcass cord topping,
the sidewall having a thickness of not more than 3.0 mm,
the inner sidewall layer having a thickness of 0.2 to 1.0 mm,
the rubber composition for an inner sidewall layer having a volume resistivity of not more than $5.0 \times 10^7$ Ω·cm,
the rubber composition for the inner sidewall layer and the rubber composition for the outer sidewall layer satisfying the following relationship (1), the rubber composition for the carcass cord topping and the rubber composition for the inner sidewall layer satisfying the following relationship (2):

$$1.80 \leq E^*(1)/E^*(2) \leq 3.00 \quad (1)$$

$$1.00 \leq E^*(1)/E^*(3) \leq 2.50 \quad (2)$$

wherein E*(1) is a complex elastic modulus of the rubber composition for an inner sidewall layer, E*(2) is a complex elastic modulus of the rubber composition for an outer sidewall layer, and E*(3) is a complex elastic modulus of the rubber composition for a carcass cord topping.

2. The pneumatic tire according to claim 1,
wherein the rubber composition for an inner sidewall layer comprises, per 100 parts by mass of a rubber component, 5 to 80 parts by mass of a carbon black (I) with a nitrogen adsorption specific surface area ($N_2SA$) of 20 to 100 m²/g and 2 to 15 parts by mass of a carbon black (II) with a nitrogen adsorption specific surface area ($N_2SA$) of 600 to 1500 m²/g, and
at least one of the rubber composition for an outer sidewall layer and the rubber composition for a carcass cord topping has a volume resistivity of not less than $1.0 \times 10^8$ Ω·cm.

3. The pneumatic tire according to claim 2,
wherein the rubber composition for an inner sidewall layer comprises:
a styrene-butadiene rubber with a styrene content of 5 to 25% by mass and a vinyl content of 20 to 70% by mass in an amount of 5 to 35% by mass based on 100% by mass of a rubber component of the rubber composition; and
a silica with a nitrogen adsorption specific surface area ($N_2SA$) of 50 to 200 m²/g in an amount of 5 to 35 parts by mass per 100 parts by mass of the rubber component.

4. The pneumatic tire according to claim 3, wherein the rubber composition for an outer sidewall layer comprises, per 100 parts by mass of a rubber component, 2 to 35 parts by mass of a polybutadiene having a number average molecular weight (Mn) of 2000 to 15000 and a vinyl content of 0 to 50% by mass.

5. The pneumatic tire according to claim 1,
wherein the rubber composition for an inner sidewall layer comprises:
a styrene-butadiene rubber with a styrene content of 5 to 25% by mass and a vinyl content of 20 to 70% by mass in an amount of 5 to 35% by mass based on 100% by mass of a rubber component of the rubber composition; and
a silica with a nitrogen adsorption specific surface area ($N_2SA$) of 50 to 200 $m^2/g$ in an amount of 5 to 35 parts by mass per 100 parts by mass of the rubber component.

6. The pneumatic tire according to claim 1, wherein the rubber composition for an outer sidewall layer comprises, per 100 parts by mass of a rubber component, 2 to 35 parts by mass of a polybutadiene having a number average molecular weight (Mn) of 2000 to 15000 and a vinyl content of 0 to 50% by mass.

* * * * *